United States Patent [19]

Beisel

[11] 4,385,871
[45] May 31, 1983

[54] WIND DRIVEN AIR PUMP

[76] Inventor: Victor A. Beisel, R.R. #1, Fargo, Okla. 73840

[21] Appl. No.: 231,058

[22] Filed: Feb. 3, 1981

[51] Int. Cl.[3] .................. F04B 17/00; F04B 17/02; F04B 35/00
[52] U.S. Cl. .................................. 417/334; 416/89; 416/121; 417/108
[58] Field of Search .................. 417/108, 334, 172; 416/121 A, 226, 9

[56] References Cited

U.S. PATENT DOCUMENTS

| | | | |
|---|---|---|---|
| 2,074,952 | 3/1937 | Albers et al. | 416/9 |
| 2,363,827 | 11/1944 | Albers | 416/10 |
| 3,367,281 | 2/1968 | Gray | 417/35 X |
| 3,930,754 | 1/1976 | Mogg et al. | 417/108 |
| 4,068,131 | 1/1978 | Jacobs et al. | 416/89 A |
| 4,110,631 | 8/1978 | Salter | 416/121 A |
| 4,174,926 | 11/1979 | Hamrick et al. | 417/334 |
| 4,298,313 | 11/1981 | Hohenemser | 416/10 X |

FOREIGN PATENT DOCUMENTS

2284780  4/1976  France .................. 417/334

*Primary Examiner*—Lloyd L. King
*Attorney, Agent, or Firm*—Harvey B. Jacobson

[57] ABSTRACT

An improved pump for lifting water from an underground source utilizes a wind motor for driving an oil-less air compressor eliminating oil contamination of ground water which is forced to the surface. The wind motor is movable to face the wind by means of a novel swivel assembly which also eliminates the formation and freezing of condensate within the airline from the compressor. The propeller blades of the wind motor and the tail section are formed from a pair of opposed convex air foil shaped surfaces which provide the propeller blades and the tail section with fast sensitivity to slight changes in wind direction and speed. A novel well tower for supporting the wind motor and compressor and for lifting the water from the underground source is an optional modification which requires no welding and eliminates the problem of condensate freezing in the airline going to the well. The wind driven air pump disclosed is lightweight, can be easily installed, is relatively inexpensive to produce and is virtually maintenance-free and capable of operating in winds exceeding 100 miles per hour.

6 Claims, 5 Drawing Figures

FIG. 1
FIG. 4
FIG. 5
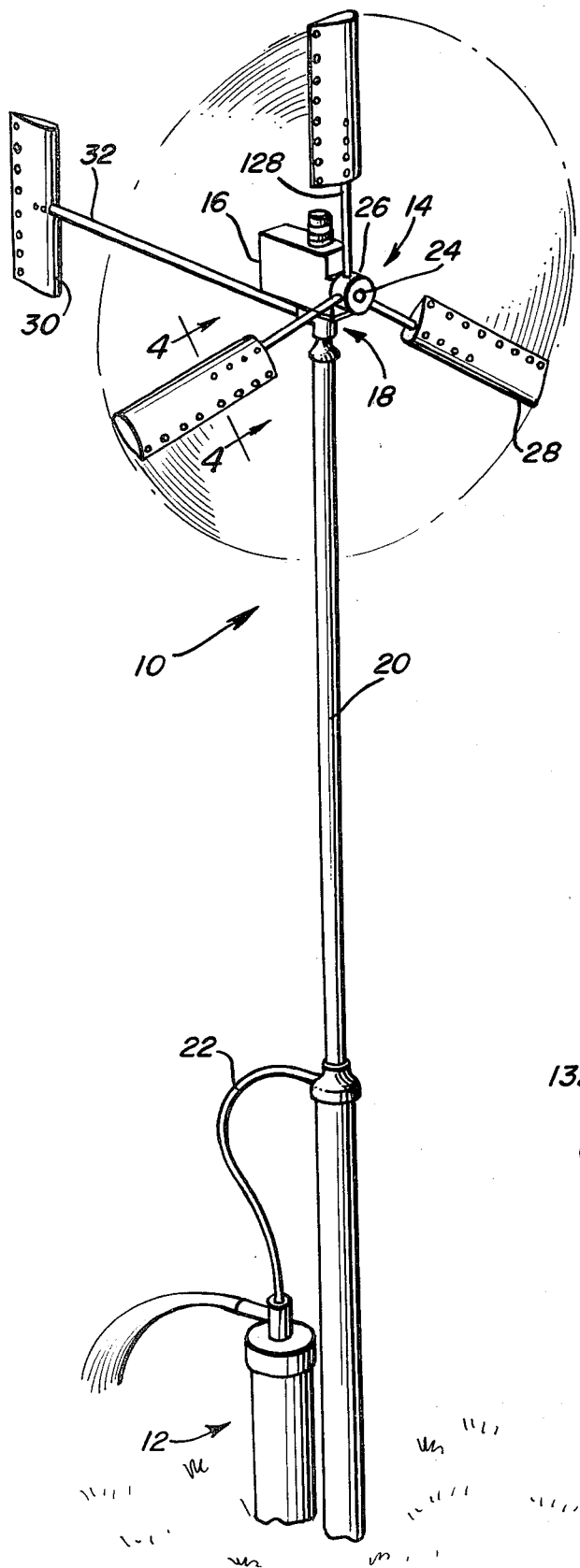
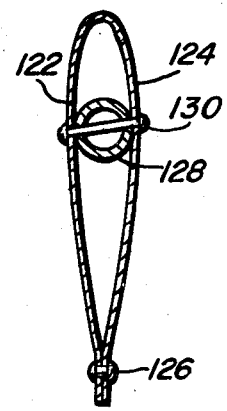
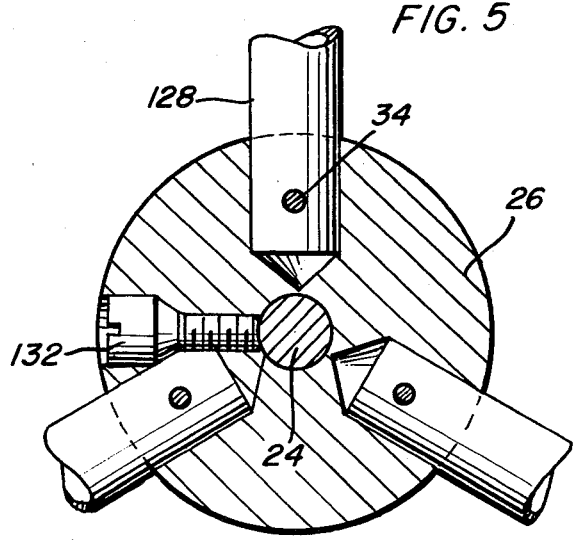

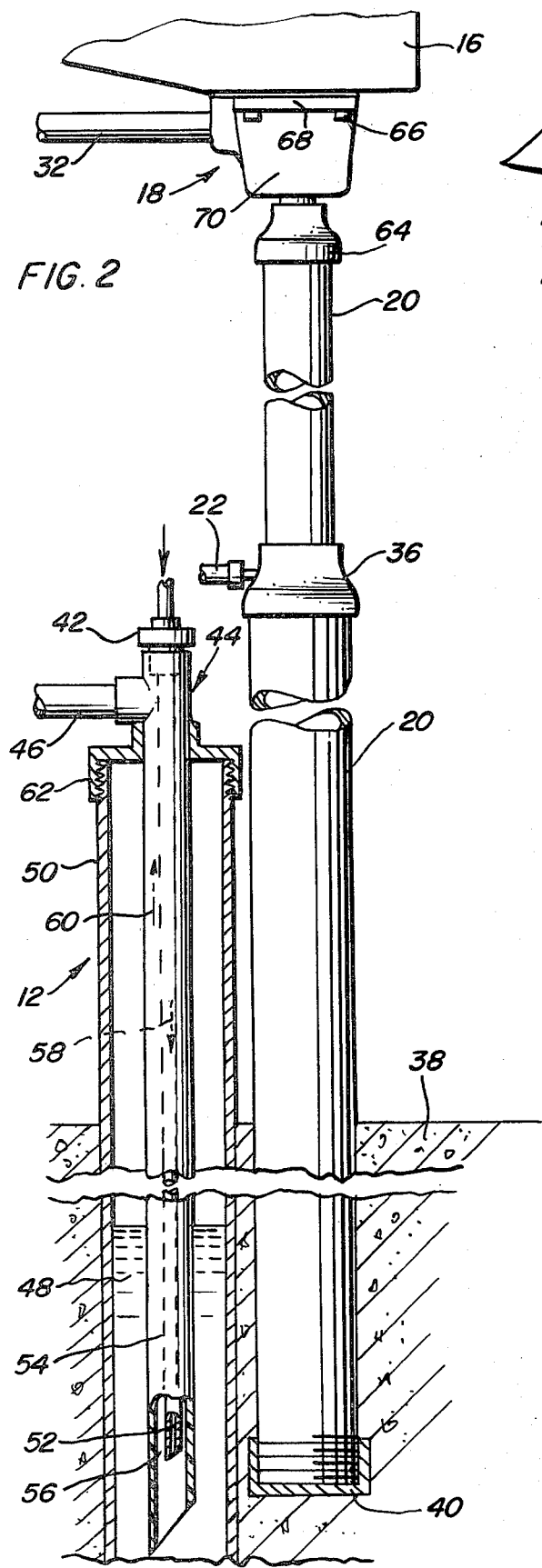
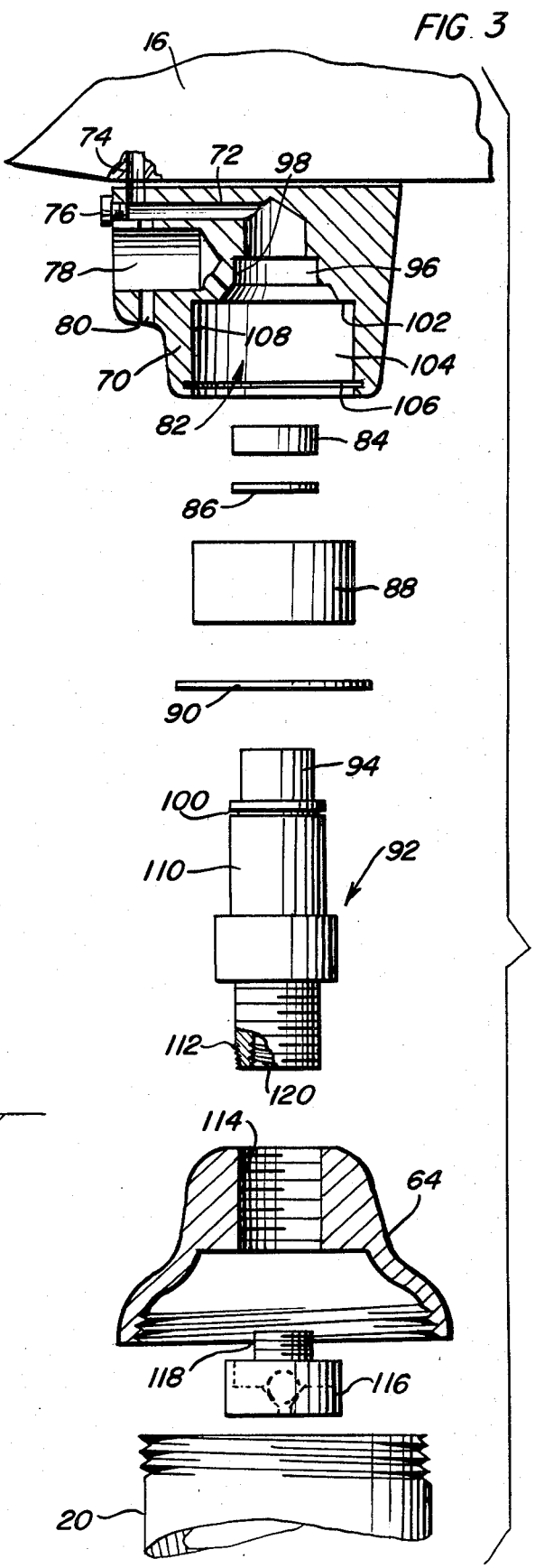

WIND DRIVEN AIR PUMP

BACKGROUND OF THE INVENTION

1. Field of the Invention

This invention relates generally to recovering water from an underground source, and in particular to an improved wind driven air pump which forces water from the underground source to the surface.

More particularly, this invention is directed to an improved pump for recovering water from an underground source for the purposes of watering livestock in which the pump is wind driven, operates virtually maintenance-free and is extremely sensitive to slight changes in wind direction.

2. Description of the Prior Art

The use of wind driven pumps was, of course, very common on farms during the early and middle part of this century for retrieving water from the wells for personal consumption as well as for watering the livestock. The wind rotatable shaft on typical windmills was mechanically linked to a reciprocating piston or other similar mechanical pumping device, forming a suction which lifted the water from the well. While such wind driven pumps have been largely replaced by electric or gas driven devices, a recent resurgence in the use of wind driven pumps is beginning due to the rising costs of operating the electric and gas variety of pumps.

Devices which utilize wind driven propellers to produce compressed air are known. In such devices, the compressed air has been used to generate electricity, pump water, for refrigeration, and the like. Examples of such devices which have been patented include U.S. Pat. No. 2,112,633, issued Mar. 29, 1938, to Moon, which discloses a wind operated electrical generating unit in which the compressed air produced drives an air operated motor operatively secured to an electrical generating unit; U.S. Pat. No. 4,068,131, issued Jan. 10, 1978, to Jacobs et al, which discloses a wind driven propeller for driving an output shaft for generating electricity, pumping water, or for operating a compressor for refrigeration or other uses; and U.S. Pat. No. 4,174,926, issued Nov. 20, 1979, to Hamrick et al, in which a wind driven water pump is disclosed containing a fluid accumulator operated on compressed air. The present invention is an improvement on such devices which utilize wind energy to produce compressed air and in particular to those devices which use the compressed air to pump water from an underground source. The present invention provides a device which operates virtually maintenance-free and free of the problems associated with prior art devices, such as the freezing of condensation in the airlines, lack of sensitivity to changes in wind direction and the complexity of the equipment which is costly to produce and install.

SUMMARY OF THE INVENTION

Briefly, this invention relates to an improved device for pumping water from an underground source. A compressor driven by a wind motor produces compressed air which is delivered to the well for displacement and retrieval of water to the surface. The wind driven pump of the present invention utilizes a novel propeller blade and tail design which is extremely lightweight to allow high speed rotation without destruction from centrifugal forces and which provides extreme sensitivity to slight wind directional changes. Each propeller blade and tail section is formed from a pair of opposed convex air foil surfaces that are easily assembled and remain secure even during severe vibration caused by winds exceeding 100 miles per hour.

Another novel feature of the wind driven pump of the present invention comprises the type of compressor utilized, one which is characterized as an oil-less air compressor, providing clean, oil-less discharge air that will not contaminate the water. Such an air compressor requires no oil, allowing the wind driven pump of the present invention to operate virtually maintenance-free.

Still another advantageous feature of the present invention involves the incorporation of a novel swivel assembly which allows the wind motor to move into a position facing the wind. The swivel assembly is designed so as to prevent freezing of condensate within the airlines and to form an excellent air seal. The swivel assembly comprises a novel base casting attached to the bottom of the compressor and communicating with the discharge air from the compressor. Within the base casting is formed a cylindrical cavity into which fits a similarly shaped base swivel held in place by a pair of snap rings. A cylindrical bearing placed around the base swivel and held between the snap rings allows the base casting and attached compressor to rotate about a central axis relative to the base swivel during movement of the wind motor into the wind. The base swivel is hollow and communicates with the air discharge port of the compressor via a cast or drilled airline formed in the base casting, the compressed air passing through the swivel into the well for displacement and retrieval of the water from the underground source. A novel well tower may be optionally included in which the wind driven compressor is positioned atop a support tower which is securely placed within the ground, an airline communicating with compressed air passing through the base swivel is placed within a well casing which is separate from the support tower. The lightweight of the whole unit and simplified structure thereof allows the complete wind driven pump to be easily installed without specialized equipment.

Accordingly, a primary object of the present invention is to provide a pump for retrieving water from an underground source which is relatively inexpensive to produce and install and which can be operated virtually maintenance-free.

Another object of the invention is to provide an improved wind driven pump which eliminates many of the problems associated with the operation of prior art wind driven pumps used for retrieving water from an underground source.

Another object of the present invention is to provide a wind driven pump with an improved propeller blade and tail design to increase operational efficiency.

Still another object of the present invention is to provide a wind motor which will produce clean, oil-less, compressed air.

Still yet another object of the present invention is to provide a wind motor which is associated with a compressor driven thereby which will produce compressed air and direct the compressed air to an underground source of water, the associated wind motor and compressor being movable into the face of the wind by an improved swivel which eliminates the problem of freezing condensate in the airline from the compressor.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view illustrating the wind driven pump of the present invention associated with a well casing for retrieving underground water.

FIG. 2 is an elevational view, partly in section, of the tower for supporting the wind motor and the well assembly for retrieving the underground water.

FIG. 3 is an exploded view, partly in section, of the base casting and swivel assembly which allows the wind motor to face into the wind.

FIG. 4 is a transverse sectional view of a propeller blade illustrating the construction thereof taken generally along line 4—4 of FIG. 1.

FIG. 5 illustrates the structure of the propeller hub for the wind motor.

DETAILED DESCRIPTION OF THE INVENTION

FIG. 1 shows wind driven pump 10 used for retrieving water from an underground source of water contained within well 12. Pump 10 is comprised of a wind motor 14, compressor 16, a swivel assembly 18, support tower and air conduit 20, and airline 22 which directs compressed air into well 12. Wind motor 14 comprises a central rotatable shaft 24 onto which is attached rotatable propeller hub 26 which is rotated by a plurality of propeller blades 28, three of which are assembled on hub 26. In some applications, wind motor 14 may be provided with five or more propeller blades. The size and pitch of the blades can also be adjusted to meet specific applications. Tail 30 is attached to swivel assembly 18 through support rod 32, tail 30 directing propeller blades 28 directly into the wind to provide maximum power. Rotation of central shaft 24 rotates the compressor blading (not shown) producing compressed air which is directed through swivel assembly 18, support tower 20 and into airline 22.

Compressor 16 is preferably one which does not require lubricating oil and which will discharge compressed air free from oil, thus eliminating water contamination. Such a compressor also eliminates the necessity of expensive oil filtration systems which require constant maintenance. The use of what can be characterized as an oil-less air compressor virtually eliminates operating maintenance and since the compressor 16 is operated by wind motor 14, total operating costs after installation are substantially zero. A preferred compressor for use in wind pump 10 is one made by ITT referred to as the "ITT Pneumotive", Model No. SGH-3051. This commercially available compressor is modified by removing the gasoline motor and substituting therefor rotatable hub 26 and propeller blades 28 which rotate central shaft 24 due to the energy derived from the winds which contact the propeller blading.

As discussed above, the air leaving compressor 16 is free from contaminating oil which is advantageous in that the compressed air is directed into an underground source of water to displace and move a portion of the water up from the source to the surface. In FIG. 2, a preferred configuration of support tower 20 and well 12 is illustrated. Support tower 20 is shown provided in a plurality of hollow pipe sections, shown in FIG. 2 as a pair of pipe sections joined by bell coupling 36. Tower 20 is supported in concrete 38 placed below ground level. Pipe cap 40 covers the bottom of tower 20 and acts as an air seal. Airline 22 in the form of a plastic or rubber hose is tapped into tower 20 and communicates with the compressed air discharged from compressor 16. Airline 22 is passed through bushing 42 placed in well tubing 44. Water delivery pipe 46 delivers water from the underground source which is forced through well tubing 44. Well tubing 44 is placed in contact with the underground source of water indicated by reference numeral 48 and is surrounded by well casing 50. Well tubing 44 is comprised of air tubing 52 communicating with airline 22 and water pipe 54 which surrounds air tubing 52, the ends of air tubing 52 and water pipe 54 placed below the water level of underground source 48. Compressed air entering air tubing 52 from airline 22 displaces a portion of the water within underground source 48, the displaced water travelling up water pipe 54 within annular space 56 formed between the outer surface of air tubing 52 and the inner surface of water pipe 54. As illustrated in FIG. 2, arrow 58 indicates the direction of compressed air while arrow 60 indicates the direction of water from underground source 48 to water delivery pipe 46 which communicates with annular space 56. Well casing 50 is sealed with a sanitary well cap 62 to prevent surface contamination of underground water source 48.

Support tower 20 is joined to swivel assembly 18 by means of bell coupling 64. Swivel assembly 18 is mounted to the bottom of compressor 16 by a plurality of screws 66 passing through exterior flange 68 of base casting 70. Swivel assembly 18 allows wind motor 14 to face into the wind deriving the maximum power from the wind energy present. The design of swivel assembly 18 is an improvement over prior art devices which were provided with narrow airlines which were constantly blocked from freezing condensate and which often did not provide an airtight seal to prevent the escape of compressed air. FIG. 3 illustrates the novel and improved swivel assembly 18 of the present invention. Base casting 70 is an aluminum alloy cast body which is secured to compressor 16 in the manner illustrated in FIG. 2. Formed within base casting 70 is air passage 72 which communicates with compressed air discharge port 74 of compressor 16. An air seal 76 is tapped within air passage 72 to prevent escape of compressed air from base casting 70. Bore 78 holds tail support rod 32, bore 80, cast or drilled, holds a roll pin (not shown) urged against support rod 32 thereby securely maintaining support rod 32 and associated tail 30 in place within base casting 70. Also formed within base casting 70 is cavity 82 communicating with air passage 72. Cavity 82 provides a housing for air seal 84, snap ring 86, bearing 88, snap ring 90 and base swivel 92. Cavity 82 is composed of a series of cylindrical shaped cavities to support each of the components forming swivel assembly 18. Air seal 84 is a ring seal placed over and around head 94 of base swivel 92. Air seal 84 and head 94 are fitted within cavity 96 whereby air seal 84 provides an airtight seal between air passage 72 and the inner wall 98 of cavity 96. Base swivel 92 contains circular groove 100 which holds snap ring 86 in place, snap ring 86 abutting shoulder 102 of bearing cavity 104, a circular groove 106 formed in bearing cavity 104 holds snap ring 90. Bearing 88 is positioned between snap rings 86 and 90 and in contact with inner wall 108 of bearing cavity 104. Bearing 88 is a hollow ring which is placed over bearing surface 110 of base swivel 92. Bearing 88 provides rotation of base casting 70 and associated compressor 16 relative to base swivel 92. Exterior threads 112 on base swivel 92 are threaded into threaded bore 114 of bell coupling 64 to hold base swivel 92 securely in place. A check valve 116 also communicates with air passage 72 to control the pressure of air passing to airline 22. Check valve 116 contains exterior threads 118 which are fitted with interior threads 120 of base swivel 92. Bell coupling 64 is joined with tower 20 by means of the matching threads shown. All joints and couplings can be sealed by means of an airtight adhesive.

Referring to FIGS. 1 and 4, each propeller blade 28 and tail 30 comprises a pair of spaced opposed convex air foil sides or surfaces 122 and 124 which are formed by folding a single sheet of lightweight material and joining the free ends such as by a plurality of rivets 126. Propeller blades 28 are open at each end forming a type of governor system in extremely high winds the centrifugal force acting upon the air within the blades 28 serving to draw air into the radial innermost ends of the blades 28 and to force air from the outermost ends of the blades and to thereby decrease the effective rotational torque applied to the shaft by wind acting upon the blades when they are orbiting at high speed. Propeller blades 28 and tail 30 are secured to blade support rods or arms 128 and tail support rod 32, respectively, by means of a series of rivets 130 passing through each surface 122 and 124 and through the respective support rod. Roll pins or other fastening means can also be used to secure blades 28 or tail 30 to the respective support rods. Aluminum metal is the preferred material for forming blades 28 and tail 30 providing a blade design of extremely lightweight. The means for holding each blade support rod 128 to hub 26 is shown in FIG. 5 in which each support rod 128 is housed within a cavity drilled into hub 26 and secured thereto by a roll pin 34. Allen screw 132 holds hub 26 against rotatable shaft 24.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pump for retrieving water from an underground source comprising in combination: a wind motor including a rotatable shaft, compressor means to compress air by rotation of said shaft, compressed air delivery means associated with said compressor and communicating with said source of underground water, a water delivery means associated with said source of underground water for delivering said water to the surface, a hub secured to said rotatable shaft and a plurality of generally radial propeller blades mounted from said hub, a tail blade stationarily mounted relative to said compressor and operable to face said blades into the wind, each of said propellor blades being air foil shaped and including a pair of opposed air foil shape sides defining a space therebetween, the opposite ends of said blades being open, said blades being joined to said hub by generally radial support rods, each of said support rods securing one of said blades to said hub, a swivel assembly positioned between said air motor and said air delivery means whereby said wind motor is movable in order to extract the maximum energy from the wind, said swivel assembly including a base member attached to said compressor means and an air passage communicating with the compressed air discharged from said compressor means, said base member having a cavity therein supporting a hollow swivel communicating with said air passage and said air delivery means, said cavity further housing a bearing which allows said base member to rotate relative to said swivel, said bearing being positioned between a pair of spaced ring members surrounding said swivel, said cavity including an air seal to prevent compressed air from escaping between said swivel and base member, said tail blade being supported from a tail support rod stationarily mounted relative to said housing, a check valve positioned between said swivel and said air delivery means, whereby the pressure of air from said compressor can be regulated before entering said air delivery means.

2. The pump of claim 1 wherein said air delivery means comprises a tubing communicating with an underground source of water, said tubing being enclosed by a pipe communicating with said source of water whereby an annular space is formed between said tubing and said pipe.

3. The pump of claim 2 wherein said pipe and said tubing are enclosed within a well casing which extends from above the surface to the underground source of water.

4. The pump of claim 3 wherein said air motor and associated compressor are supported by a hollow tower, one end of said tower joined with said swivel to support said air motor above ground level, the opposite end of said tower extending and supported below ground level, said tubing communicating with said tower, said well casing being separate from said support tower.

5. A pump comprising in combination, a wind motor including a rotatable shaft having generally radial blades supported therefrom, a compressor means capable of compressing and discharging compressed air during rotation of said shaft, movement means associated with said compressor to allow said wind motor to face the wind, said movement means comprising a housing attached to said compressor means, compressed air delivery means associated with said compressor and communicating with a point of use of said compressed air, said delivery means including a housing supported from compressor means and defining a hollow cavity communicating with the compressed air discharged by said compressor means, a hollow swivel means contained within said cavity and communicating with said discharged air, a bearing means in said cavity allowing said housing to rotate relative to said swivel means, air seal means to prevent compressed air from escaping between said housing and said swivel means and a check valve positioned between said swivel and said air delivery means, whereby the pressure of air from said compressor can be regulated before entering said air delivery means.

6. A wind motor including a mount, horizontal shaft means journaled from said mount, a plurality of elongated generally radial blade support arms mounted on said shaft and including inner and outer ends, an elongated hollow air foil cross section shaped elongated blade mounted on each arm for rotation therewith and including open opposite ends, said blades each including a pair of spaced apart opposing sides extending longitudinally thereof and joined along corresponding longitudinal marginal portions, the outer end portion of each arm extending longitudinally through the corresponding blade between the opposing sides thereof and occupying a minor portion of the interior of said blade, the innermost ends of said blades being spaced outward of the inner ends of said arms and said shaft means and open to receive air therein to replace air discharged from the outermost ends of said blades by centrifugal force acting thereon during orbital swinging of said blades at high speed, whereby the air pumped through said blades during high speed orbital motion thereof will decrease the effective rotational torque applied to the shaft means by wind acting upon the blades.

* * * * *